(12) United States Patent
Mueller et al.

(10) Patent No.: US 9,395,742 B2
(45) Date of Patent: Jul. 19, 2016

(54) CONTROL UNIT FOR A FUNCTIONAL DEVICE IN A MOTOR VEHICLE

(71) Applicant: AUDI AG, Ingolstadt (DE)

(72) Inventors: Ulrich Mueller, Ingolstadt (DE);
Johann Schneider, Wettstetten (DE);
Manfred Mittermeier, Altmannstein (DE); Tahar Bouaziz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 82 days.

(21) Appl. No.: 14/422,981

(22) PCT Filed: Aug. 9, 2013

(86) PCT No.: PCT/EP2013/002392
§ 371 (c)(1),
(2) Date: Feb. 20, 2015

(87) PCT Pub. No.: WO2014/032763
PCT Pub. Date: Mar. 6, 2014

(65) Prior Publication Data
US 2015/0205321 A1  Jul. 23, 2015

(30) Foreign Application Priority Data
Aug. 31, 2012  (DE) .......................... 10 2012 017 266

(51) Int. Cl.
*G06F 7/00* (2006.01)
*G05G 1/10* (2006.01)
*G05G 1/08* (2006.01)
*B60H 1/00* (2006.01)

(52) U.S. Cl.
CPC ................ *G05G 1/10* (2013.01); *B60H 1/0065* (2013.01); *G05G 1/08* (2013.01)

(58) Field of Classification Search
None
See application file for complete search history.

(56) References Cited

U.S. PATENT DOCUMENTS 5,140,316 A * 8/1992 DeLand .................... B60J 5/06
                                                                180/271
2002/0057152 A1   5/2002 Elferich et al.
(Continued)

FOREIGN PATENT DOCUMENTS

DE     198 48 941 A1    5/2000
DE     101 26 076 A1    12/2002
(Continued)

OTHER PUBLICATIONS

Office Action mailed Jul. 8, 2013 for corresponding German Patent Application No. 10 2012 017 266.4.
(Continued)

*Primary Examiner* — Adam Alharbi
(74) *Attorney, Agent, or Firm* — Staas & Halsey LLP

(57) ABSTRACT

A control unit controls a functional device of a motor vehicle. The control unit has a rotary adjuster that is mounted in a rotatable manner on a holding element. The rotary adjuster has at least one encoding element, a detecting device for detecting an absolute angle of rotation between the rotary adjuster and the holding element with reference to an encoding of the at least one encoding element and a latching device and the rotary adjuster is provided with a plurality of latching positions along a direction of rotation by the latching device. The detecting device is embodied so as with reference to the encoding of the at least one encoding element to detect the respective latching position and the absolute angle of rotation between at least two of the latching positions.

10 Claims, 2 Drawing Sheets

(56) References Cited

U.S. PATENT DOCUMENTS

| | | |
|---|---|---|
| 2006/0132469 A1 | 6/2006 | Lai et al. |
| 2010/0140059 A1 | 6/2010 | Kagami et al. |
| 2010/0302018 A1 | 12/2010 | Tuzar et al. |
| 2012/0239230 A1 | 9/2012 | Weber |
| 2015/0258895 A1* | 9/2015 | Bouaziz .................. B30K 37/06 701/36 |

FOREIGN PATENT DOCUMENTS

| | | |
|---|---|---|
| DE | 103 47 318 A1 | 5/2005 |
| DE | 10 2005 040 125 A1 | 6/2006 |
| DE | 10 2005 025 887 A1 | 1/2007 |
| DE | 10 2005 055 307 A1 | 1/2007 |
| DE | 10 2007 030 302 A1 | 1/2008 |
| DE | 10 2006 043 619 A1 | 3/2008 |
| DE | 10 2006 060 808 A1 | 6/2008 |
| DE | 10 2008 057 098 A1 | 5/2010 |
| DE | 10 2009 053 457 A1 | 5/2011 |
| DE | 10 2012 017 266.4 | 8/2012 |
| EP | 1 621 953 A1 | 2/2006 |
| EP | 2013/002392 | 8/2013 |
| WO | WO 2005/036293 A1 | 4/2005 |
| WO | WO 2007/003338 A1 | 1/2007 |
| WO | WO 2008/012063 A1 | 1/2008 |

OTHER PUBLICATIONS

International Search Report mailed Nov. 18, 2013 for corresponding International Patent Application No. PCT/EP2013/002392.
English language copy of the International Preliminary Report on Patentability for PCT/EP2013/002392, mailed Mar. 5, 2015, 6 pages.

* cited by examiner

CONTROL UNIT FOR A FUNCTIONAL DEVICE IN A MOTOR VEHICLE

CROSS REFERENCE TO RELATED APPLICATIONS

This application is based on and hereby claims priority to International Application No. PCT/EP2013/002392 filed on Aug. 9, 2013 and German Application No. 10 2012 017 266.4 filed on Aug. 31, 2012, the contents of which are hereby incorporated by reference.

BACKGROUND

The present invention relates to a control unit for a functional device of a motor vehicle. Moreover, the present invention relates to a motor vehicle.

Corresponding control units are provided for the purpose of operating functional devices of a motor vehicle. These control units can comprise a rotary adjuster or a rotary encoder. Modern rotary adjusters comprise mechanical latching positions in which said rotary adjusters latch along their direction of rotation. These latching positions are perceived by the user or rather the operating person in a haptic manner. In addition, an acoustic signal by way of example a click is often also output. Rotary adjusters of this type are widely used and are used by way of example in climate-control operating parts or in the central input unit in the motor vehicle. Generally, the rotary adjusters are used so as to switch to a specific function. By way of example, the temperature per latching step in a climate-control operating part is increased by a predetermined temperature (by way of example 0.5° C.) or the rate of the impeller unit is increased.

In graphic-based systems, such as a human-machine interface, the rotary adjuster can be used so as to navigate in the display of the human-machine interface. An adjustment of the rotary adjuster by one latching position causes the screen display to displace by one step upwards or downwards. In the case of a navigation system, the adjustment of the rotary adjuster by one latching position can cause the scale of the map display to increase or decrease by one step.

The latching positions of the rotary adjuster are generally produced mechanically using a latching curve or magnetically using magnetic pole pairs. With each latching position, a corresponding electric value is output. In other words, in the case of a rotation into the next latching position, an electrical signal is evaluated by a control device in order to determine the direction of rotation and the number of latching steps or rather clicks. This signal conforms to the latching steps that can be perceived in a haptic manner and in which the rotary adjuster latches or rather remains stably secure after the rotation.

If, in the case of a climate-control operating part, an operating person rotates the rotary adjuster by three latching positions to the right, the control device receives three signals and determines therefrom three rotations to the right and increases the temperature by three steps. Generally, the position of the rotary encoder is detected optically or by friction contacts. Typically, two encoding elements are provided that are arranged on the rotary encoder. Said encoding elements comprise an angular-offset encoding arrangement along the direction of rotation with reference to which it is possible for a detection device to detect the direction of rotation.

In this context, DE 10 2005 025 887 A1 discloses a control unit for a motor vehicle having a rotary/push control element. The rotary/push control element is embodied in such a manner that a marking element can be moved on a display device as a result of said rotary/push control element being actuated, wherein latching positions are provided during a rotation movement of the rotary/push control element.

Furthermore, U.S. 2002/0057152 A1 discloses a control unit having a rotary element. The angle of rotation of the rotary element can be detected using a Hall sensor. A haptic notification can be output to the operating person in dependence upon the angle of rotation.

DE 10 2005 055 307 A1 describes a rotary adjuster having an incremental angle-of-rotation sensor for use in a motor vehicle. An encoding element having periodic recesses is fastened to a shaft of the rotary adjuster. The recesses rotate through the detection range of a light barrier as a result of rotating the rotary adjuster and the associated rotation of the encoding element. This causes a modulation of the analog output voltage of a photosensor. By an evaluating electronic system, it is possible to allocate an incremental angle of rotation of the rotary adjuster to the progression of the analog output voltage.

DE 10 2006 060 808 A1 discloses an angle sensor for detecting the angle of rotation of a component, said angle sensor having an annular or circular disc-shaped magnet. A Hall element is arranged within the range of the magnetic field of the magnet and it is possible using said Hall element to produce a digital signal that is dependent upon the rotary position of the magnet. In addition, an analog signal of a magnetic-resistive sensor element can be allocated in dependence upon the digital signal to a first 180° angular range or to a second 180° angular range of a 360° angular range, said second 180° angular range following said first angular range.

Finally, DE 10 2008 057 098 A1 describes a rotary adjuster for a vehicle and said rotary adjuster comprises a latching arrangement and a movement detection arrangement. It is possible using a sensor device of the rotary adjuster to detect the direction of rotation and the angle of rotation of an adjusting element.

SUMMARY

One possible object is to provide a control unit of the type mentioned in the introduction with which a simpler and more intuitive operation is rendered possible.

The inventors propose a control unit for a functional device of a motor vehicle, that comprises a rotary adjuster that is mounted in a rotatable manner on a holding element and said rotary adjuster comprises at least one encoding element, a detecting device for detecting an absolute angle of rotation between the rotary adjuster and the holding element with reference to an encoding of the at least one encoding element, and said rotary adjuster comprises a latching device by which a plurality of latching positions are provided to the rotary adjuster along a direction of rotation, wherein the detecting device is embodied so as with reference to the encoding of the at least one encoding element to detect the respective latching position and the absolute angle of rotation between at least two of the latching positions.

The control unit can be arranged in the dashboard or in the center console of the motor vehicle. The motor vehicle can also comprise multiple control units with which it is possible to control functional devices, such as for example a climate-control unit, a navigation system, a control unit having an associated display, an entertainment system or the like. The control unit comprises a rotary adjuster that can also be embodied as a rotary/push adjuster. Furthermore, the control unit comprises a latching device that provides multiple latching steps or rather latching positions to the rotary adjuster. These latching positions can be produced mechanically using a latching curve or by corresponding magnets. As the rotary adjuster rotates, it latches in the latching positions.

At least one encoding element is arranged on the rotary adjuster. The at least one encoding element preferably extends along the circumferential direction of the rotary adjuster or a shaft of the rotary adjuster. In addition, the control unit comprises a detecting device that can comprise a sensor. Furthermore, the detecting device can be arranged in a permanently fixed manner on the holding element or on a housing of the control unit. As a result of the encoding of the at least one encoding element, a sensor signal or rather a corresponding output signal is provided in the detecting device. This encoding element can by way of example comprise one or multiple magnets and the detecting device can comprise a magnetic sensor, by way of example a Hall sensor. As an alternative thereto, the encoding element can comprise recesses or a predetermined geometry that can be sensed by an optical sensor of the detecting device. Likewise, the use of friction contacts is feasible.

The detecting device of the control unit is embodied so as with reference to the encoding of the at least one encoding element to detect individually the predetermined latching positions. Consequently, it is no longer necessary to individually evaluate the latching steps. In addition, it is possible to detect by the detecting device the absolute angle of rotation between at least two latching positions. The angle of rotation of the rotary adjuster in relation to the holding element can be evaluated with an accuracy that is less than 1°. In addition, it is possible using the detecting device and with reference to the encoding of the at least one encoding element to detect the direction of the rotation of the rotary adjuster. The control unit is provided with specific latching positions that by the haptic notification provide the operator with a feeling that they are using high quality equipment. Furthermore, slight movements of the rotary adjuster prior to latching in the next latching position can be detected by the detecting device. As a consequence, it is also possible in a simple manner in addition to the latching positions to detect with a high degree of resolution the intermediate positions between the latching steps and accordingly further process said intermediate positions.

In one embodiment, the control unit comprises a control device that in dependence upon the detected latching position and/or in dependence upon the detected absolute angle of rotation between the at least two latching positions outputs a control signal so as to operate the functional device. The control device can be coupled to the detecting device. In dependence upon the output signals that are detected by the detecting device, it is possible using the control unit to output control signals so as to control the functional devices of the motor vehicle. It is possible to produce corresponding control signals in the latching positions of the rotary adjuster and at the intermediate positions. In addition, the direction of rotation of the rotary adjuster can be taken into account. It is possible to achieve different advantages if the direction of rotation and the angle of rotation are known prior to achieving the next mechanical click. It is thus possible, prior to achieving a latching position, to start a calculating process in a functional device. In addition, more fluid movements and transitions of the graphic elements can be rendered possible in the case of graphic displays.

It is preferred that the detecting device is embodied so as with reference to the encoding of the at least one encoding element to detect a rate of rotation and/or a change of the rate of rotation of the rotary adjuster. Graphic displays can be tailored accordingly in dependence upon the rate of rotation. In addition, it is possible by evaluating the rate of rotation or rather the change in the rate of rotation to control the functional devices in an improved manner in dependence upon the control inputs of the user.

In one embodiment, the rotary adjuster comprises two encoding elements and the detecting device outputs with reference to the respective encoding of the encoding elements an analog output signal for each of the encoding elements. The two analog signals can be produced in an optical, magnetic or mechanical manner. The progression of the two analog signals can be identical along the direction of rotation. It is preferred that a fundamentally sinusoidal output signal is provided for each of the encoding elements by the detecting device with reference to the encoding along the direction of rotation. The encoding elements are preferably embodied and arranged on the rotary adjuster in such a manner that the two analog signals that are provided by the detecting device are offset with respect to one another. As a consequence, the direction of rotation of the rotary adjuster can be determined in a simple manner.

It is preferred that the detecting device determines the respective latching position by taking into account the fact that at least one of the analog output signals exceeds a threshold value. It is possible to determine a type of digital signal as a result of predetermining a threshold value for each of the analog signals. It is possible to conclude individual latching positions with reference to the progression of said digital signal. This digital signal can be drawn upon for a reliable evaluation since insignificant changes in the linearity or displacements of the respective output signal still always result in a secure digital signal.

Furthermore, the detecting device determines the absolute angle of rotation between the at least two latching positions preferably with reference to an increasing and/or a decreasing progression of at least one of the analog output signals. The amplitude of one or the two analog signals can be used so as to evaluate the angle of rotation between the rotary adjuster and the holding element. The increasing or decreasing ranges or rather sections of the analog signal are drawn upon. The analog output signal alone can also be drawn upon so as to determine the angle of rotation and the signal progression of said analog output signal comprises an increasing or decreasing progression at the point in time at which the angle of rotation is determined. The analog signals can also be digitized using an analog to digital converter, wherein each value of the signal amplitude can be allocated a value of an angle of rotation. A precise evaluation of the angle of rotation is not necessary since as is described above the angle of rotation, the rate of rotation and/or the change in the rate of rotation are evaluated. Consequently, it is possible to accept non-linearities or displacements in the analog signals.

In a further embodiment of the control unit, the rotary adjuster comprises three encoding elements and with reference to the respective encoding of the encoding elements the detecting device outputs in each case a digital output signal for two of the three encoding elements and for the third of the three encoding elements said detecting device outputs an analog signal. It is also possible in this embodiment of the control unit to produce the output signals in an optical or magnetic manner or by friction contacts. The detecting device outputs with reference to two of the three encoding elements in each case a digital output signal. The detecting device outputs an analog output signal as a result of detecting a third encoding element. As a result of these three output signals, it is possible to detect the individual latching positions and the angle of rotation between at least two latching positions in a simple and reliable manner.

It is preferred that the detecting device determines with reference to the two digital output signals the direction of rotation and the respective latching position of the rotary adjuster. It is possible for the detecting device to output in each case a digital output signal by detecting the encoding elements and said encoding elements are preferably embodied and arranged along the circumferential direction of the rotary adjuster in such a manner that the two digital signals that are detected are offset with respect to one another. As a consequence, the direction of rotation of the rotary adjuster can be determined in a simple manner. Furthermore, the encoding of these two encoding elements can be embodied in such a manner that the individual latching positions can be determined with reference to the two digital signals.

In a further embodiment, the detecting device determines with reference to the analog output signals the absolute angle of rotation between the at least two latching positions. The analog output signal can be determined in proportion to the angle of rotation. As a consequence, the angle of rotation can be determined in a precise manner with reference to the amplitude of the analog signal.

The inventors also propose a motor vehicle that includes at least one functional device and an above-described control unit for operating the at least one functional device. The above-described advantages in relation to the control unit and further developments can be transferred in a similar manner to the motor vehicle.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
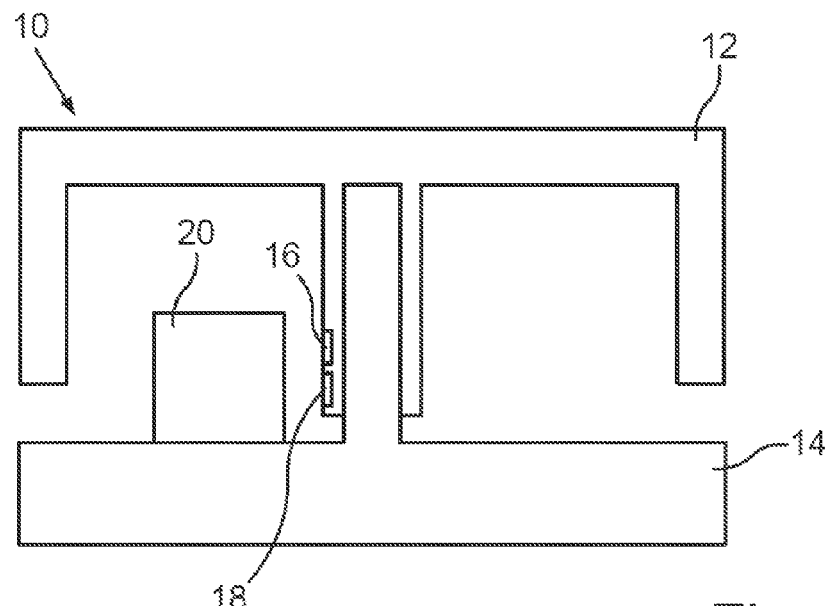
FIG. 1 illustrates schematically a control unit in a sectional side view.

Reference will now be made in detail to the preferred embodiments of the present invention, examples of which are illustrated in the accompanying drawings, wherein like reference numerals refer to like elements throughout.

FIG. 1 illustrates schematically a control unit 10 in a sectional side view. The control unit 10 is used so as to operate a functional device of a motor vehicle. A functional device of this type can be a climate-control unit, a navigation system, a control device with an associated display, an entertainment system or the like. The control unit 10 comprises a rotary adjuster 12 that is mounted in a rotatable manner on a holding element 14. Furthermore, two encoding elements 16 and 18 are arranged on the rotary adjuster 12. The encoding elements 16, 18 can comprise one or multiple magnets. As an alternative thereto, the encoding elements 16, 18 can comprise electrical contacts. In a further embodiment, the encoding elements 16, 18 can comprise corresponding recesses.

Furthermore, the control unit 10 comprises a detecting device 20 that is securely, mechanically connected to the holding element 14. The detecting device 20 can comprise a corresponding sensor element that cooperates with the encoding elements 16, 18 in such a manner that in each case an output signal is provided by the detecting device 20 in dependence upon an encoding of the encoding elements 16, 18. If the encoding elements 16, 18 comprise magnets, the detecting device 20 can comprise a magnetic sensor, by way of example a Hall sensor. If the encoding elements 16, 18 comprise electrical contacts, the detecting device 20 can comprise friction contacts. If the encoding elements 16, 18 are formed by recesses, the detecting device 20 can comprise an optical sensor.

Figure 2:
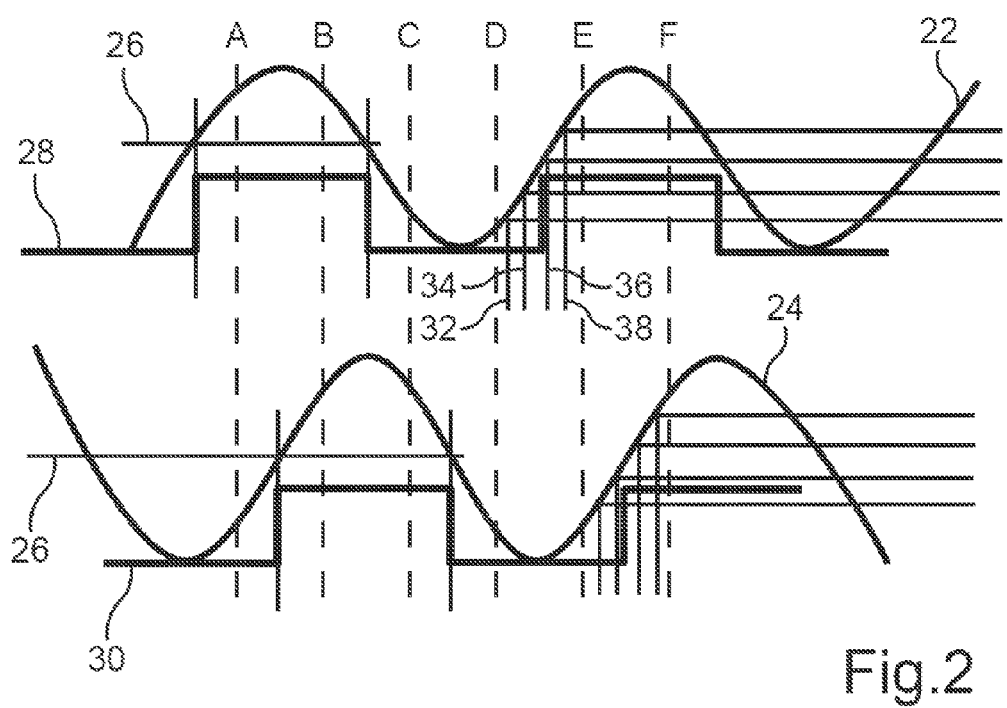
FIG. 2 illustrates output signals of a detecting device of the control unit.

FIG. 2 illustrates the respective progression of the output signals 22 and 24 that are output by the detecting device 20 in dependence upon the direction of rotation of the rotary adjuster 12. In each case an output signal 22, 24 is produced as a result of rotating the rotary adjuster 12 by the two encoding elements 16 and 18 in the detecting device 20. By way of example, the output signal 22 is produced by the encoding element 16 being detected or rather sensed by the detecting device 20. The output signal 24 is produced by the detecting device 20 detecting the encoding element 18. The encoding elements 16, 18 are embodied in such a manner that in each case an substantially continuous or rather analog output signal 22, 24 is produced, wherein the output signals 22, 24 are offset with respect to one another along the direction of rotation. In the present case, the output signals 22, 24 comprise an substantially sinusoidal progression.

The control unit 10 comprises in addition a latching device that is not illustrated in this figure and latching positions are provided to the rotary adjuster 12 by said latching device. In the present exemplary embodiment, six latching positions A, B, C, D, E and F are provided by the latching device and said latching positions are characterized in FIG. 2. The encoding of the encoding elements 16, 18 is selected in such a manner that the maxima and minima of the output signals 22, 24 lie in each case in the middle between two of the latching positions A to F.

A threshold value 26 is in each case predetermined so as to evaluate the analog output signals 22, 24. In each case a digital signal 28 and 30 can therefore be determined for each of the analog output signals 22, 24. The respective digital signal 28, 30 assumes the value "one" if the associated output signal 22, 24 exceeds the threshold value 26. In the regions in which the respective output signal 22, 24 does not exceed the threshold value 26, the associated digital signal 28, 30 assumes the value "zero". The direction of rotation and the individual latching positions A to F can be determined with reference to the respective values of the two digital signals 28, 30.

Furthermore, the angle of rotation between at least two latching positions A to F can be determined with reference to the output signals 22, 24. In order to determine the angle of rotation in a region between at least two latching positions A to F, the output signal 22, 24 is drawn upon and said angle comprises an increasing or decreasing progression in this region. In the present example, the angle of rotation between the two latching steps D and E is to be determined. In this example, four values 32, 34, 36 and 38 are established in the region between the latching steps D and E and the respective amplitude of the output signal 22, 24 is determined at the values 32 to 38. For this purpose, only the amplitudes of the output signal 22 are determined whose signal increases in the region between the latching steps D and E. The output signal 24 that comprises a minimum value in this region is not taken into account since the amplitude values of the output signal 24 can be identical to the values 32 to 38 or can be very close to one another. Only the output signal 24 is investigated so as to determine the angle of rotation between the latching positions E and F and said output signal comprises an increasing progression in this region (cf. FIG. 2).

Figure 3:
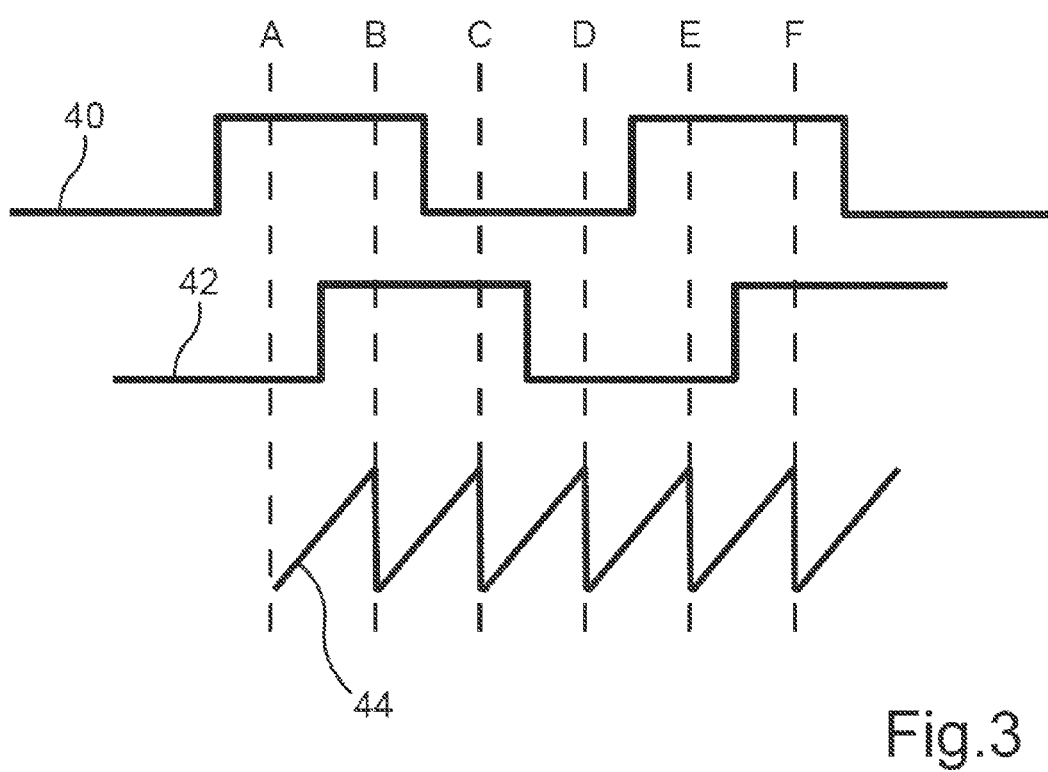
FIG. 3 illustrates output signals of the detecting device of the control unit in a further embodiment.

The control unit 10 can also comprise three encoding elements 16, 18. FIG. 3 illustrates the progression of output signals 40, 42 and 44 that are output by a detecting device 20 of a control unit 10 and said detecting device comprises three encoding elements 16, 18. The encoding elements 16, 18 are embodied in such a manner that the detecting device 20 in each case outputs a digital output signal 40, 42 by detecting two of the three encoding elements 16, 18. It is possible, as is explained in relation to the digital signals 28 and 30 in FIG. 2, for the direction of rotation and the individual latching positions A to F to be determined with reference to the digital output signals 40, 42. An output signal 44 is output by the detecting device 20 by evaluating the third of the three encoding elements 16, 18 and said output signal at least in regions comprises a continuous or rather analog progression. The angle of rotation between two of the latching positions A to F can be determined with reference to the output signal 44.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A control unit for a functional device of a motor vehicle, comprising:
   a holding element;
   a rotary adjuster that is mounted in a rotatable manner on the holding element, to rotate in a direction of rotation, the rotary adjuster comprising three encoding elements;
   a latching device to produce a plurality of latching positions for the rotary adjuster along the direction of rotation; and
   a detecting device to produce a digital output signal for two of the three encoding elements, to produce an analog output signal for a third of the three encoding elements, to detect a current latching position of the rotary adjuster and to detect an absolute angle of rotation between the rotary adjuster and the holding element, the absolute angle of rotation being an absolute angle of rotation between at least two of the latching positions, the current latching position and the absolute angle of rotation being detected based on an encoding of the encoding elements.

2. The control unit as claimed in claim 1, wherein
   the control unit comprises a control device to output a control signal to operate the functional device, the control signal being output in dependence upon at least one of the current latching position and the absolute angle of rotation detected between the at least two latching positions.

3. The control unit as claimed in claim 1, wherein
   the detecting device detects, based on the encoding of the encoding elements, at least one of a rate of rotation of the rotary adjuster and a change in the rate of rotation of the rotary adjuster.

4. The control unit as claimed claim 1, wherein
   the detecting device determines a direction of rotation of the rotary actuator based on the digital output signals produced for the two of the three encoding elements, and
   the detecting device also determines the current latching position of the rotary adjuster based on the digital output signals produced for the two of the three encoding elements.

5. The control unit as claimed in claim 1, wherein
   the detecting device determines the absolute angle of rotation between the at least two latching positions based on the analog output signal.

6. The control unit as claimed in claim 1, wherein the rotary adjuster is a push-turn adjuster.

7. The control unit as claimed in claim 1, wherein the functional device is selected from the group consisting of an navigation system, a climate control system and an entertainment system.

8. The control unit as claimed in claim 1, wherein the encoding elements extend circumferentially around the rotary adjuster or a shaft of the rotary adjuster.

9. The control unit as claimed in claim 1, wherein the control unit is configured as at least one of the following:
   magnets are provided as the encoding elements and a magnetic sensor is provided as the detecting device,
   recesses are respectively provided as the encoding elements and an optical sensor is provided as the detecting device, and
   electrical contacts are respectively provided as the encoding elements and friction contacts are provided as the detecting device.

10. A motor vehicle comprising:
    a functional device; and
    a control unit to operate the functional device, the control unit comprising:
       a holding element;
       a rotary adjuster that is mounted in a rotatable manner on the holding element, to rotate in a direction of rotation, the rotary adjuster comprising three encoding elements;
       a latching device to produce a plurality of latching positions for the rotary adjuster along the direction of rotation; and
       a detecting device to produce a digital output signal for two of the three encoding elements, to produce an analog output signal for a third of the three encoding elements, to detect a current latching position of the rotary adjuster and to detect an absolute angle of rotation between the rotary adjuster and the holding element, the absolute angle of rotation being an absolute angle of rotation between at least two of the latching positions, the current latching position and the absolute angle of rotation being detected based on an encoding of the encoding elements.

* * * * *